Feb. 16, 1960 A. WINKLER ET AL 2,925,022
REFLEX CAMERA
Filed March 24, 1954 2 Sheets-Sheet 1
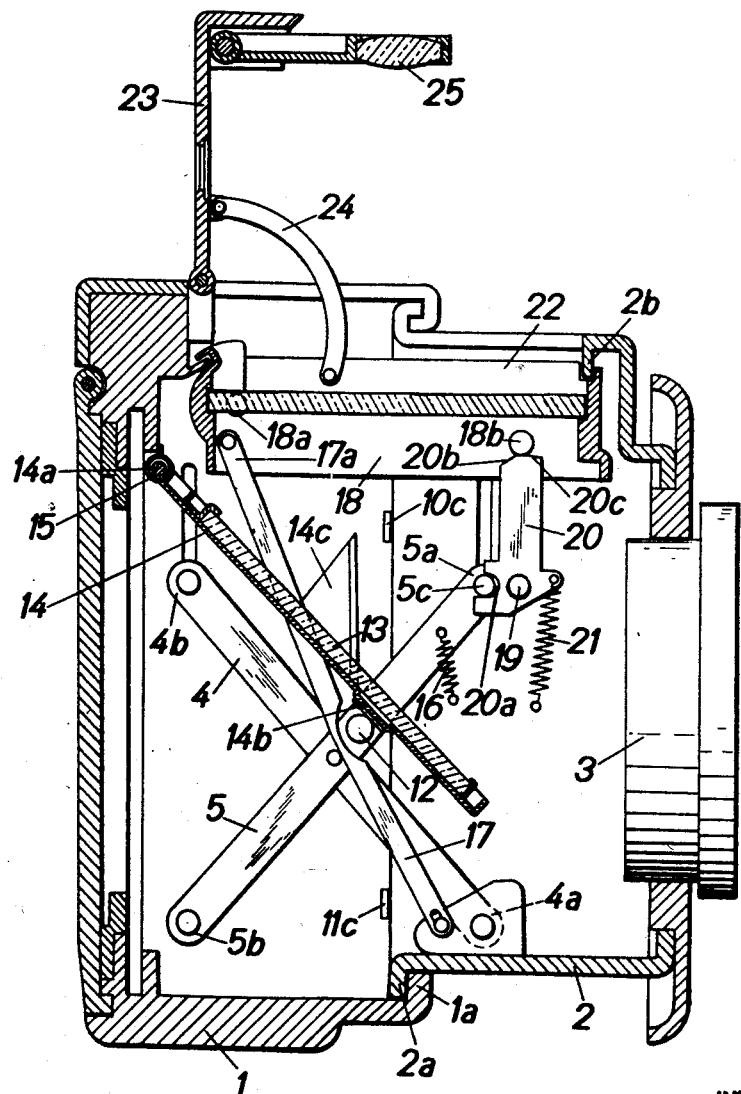
INVENTORS:
ALFRED WINKLER
WILLY KADEN

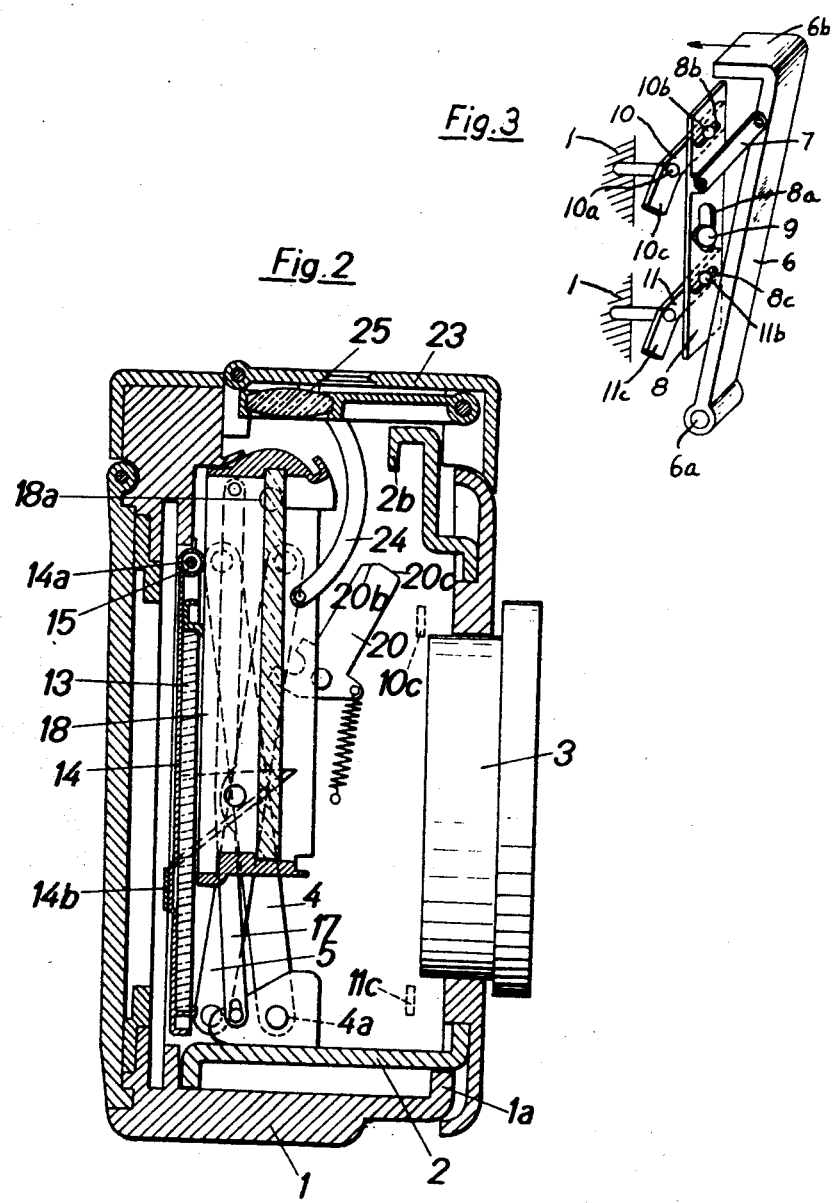

United States Patent Office 2,925,022
Patented Feb. 16, 1960

2,925,022

REFLEX CAMERA

Alfred Winkler and Willy Kaden, Munich, Germany, assignors to AGFA Aktiengesellschaft Application March 24, 1954, Serial No. 418,336

Claims priority, application Germany April 10, 1953

12 Claims. (Cl. 95—42)

The present invention relates to an extension-type reflex camera. Such cameras are commonly constructed to provide a guide in the camera housing for an extension tube shaped as a rigid, box-shaped part slidable in the frame of the camera housing. Means are also commonly provided to lock the extension, after the extreme extended position has been reached, by means of spring stops provided on the bottom wall of the extensible part. The only purpose of this locking is to prevent any accidental backward movement of the extensible part. The extension tube held in this manner in its extended position, still has too much play to ensure the positive positioning of the said extension tube with respect to the camera housing which is necessary for the sharp focusing of the lens. When the lens front is connected with the camera housing through lazy-tongs linkage, the positive positioning of the objective can be insured only by requiring very close tolerances in the arrangement and guiding of the struts. Furthermore, in conventional reflex cameras the members for moving and locking the mirror and the ground-glass focusing screen, are generally provided inside the camera housing.

With a view to combining the advantages of an extending camera having lazy-tongs linkage with those of a reflex camera, and to facilitate the sharp focusing of the lens without the use of lazy-tongs linkage made to especially close tolerance, it is proposed, according to the present invention, to guide the camera extension in its movement relative to the camera housing by means of lazy-tongs struts located on the camera housing, and to lock it to a stationary surface of the camera, the actuating and locking members for the reflex mirror and the focusing screen being lodged inside the camera extension tube.

To lock the camera extension tube in position there is provided on both sides of the camera housing a lever capable of pivoting about a stationary point on the camera; this lever acts through a connecting link on a slide which controls, through a pin-and-slot connection, at least one locking member in a manner such that the extended camera tube is pressed against a stationary surface of the camera. On the lazy-tongs struts there are provided pins which pivot the reflex mirror into the viewing position against spring loading while the camera extension tube is being extended.

The frame of the focusing screen is controlled by means of a link, connected with the camera tube, which link pivots the frame of the focusing screen into the viewing position while the camera tube is being extended. To lock the frame of the focusing screen in the viewing position, there is provided a locking lever which is attached to the camera extension tube and connects the frame of the focusing screen with the lazy-tong links. This locking lever is designed as a toggle lever, one end of which has a recess in which there engages a spring loaded pin located on the camera; whereas the other end rests against an abutting part of the frame of the focusing screen such as a pin. The end of the locking lever resting against this pin on the frame of the focusing screen has an inclined surface for the pin and a locking surface pressing against the pin. The cover for the focusing screen is connected with the frame of the screen by means of a link.

The advantage of the device embodying this invention lies in the fact that the strut-type guiding mechanism for the extensible camera tube is, by virtue of the novel locking device of the camera tube, no longer under stress so that it does not require special precision in its manufacture. Furthermore, the control of the reflex mirror and the control and locking of the focusing screen by means of the struts and links attached to the camera extension tube are an essential simplification of the hitherto known complicated lever system located inside the camera housing.

The invention is illustrated in the accompanying drawings in which.

Fig. 1 is a section through a reflex camera with extension tube extended,

Fig. 2 is a section through the camera with the tube pushed in, and

Fig. 3 is a perspective view of a locking device for the tube when in the extended position.

Referring to the drawings, 1 is a camera housing and 2 an extensible tube which carries a lens 3. 4 and 5 are lazy tongs struts the ends 4a, 5a of which are pivoted in the interior of the tube 2, whereas their other ends 4b, 5b are pivoted in known manner in the camera housing 1. A frame flange 1a on the housing 1 limits the extension of the tube 2. To facilitate the extension of the tube, the struts 5 are loaded by a spring 16 attached to the tube 2. To insure the exact positioning of the tube 2, and with it of the lens 3, it is necessary to lock the extended tube 2 in its fully extended position. This is done against a stationary surface, in this case the frame 1a of the camera housing 1, by means of a lever 6 (Fig. 3) so fitted to the camera housing 1 that it can pivot about the pin 6a, said lever 6 forming a toggle lever system with a link 7 and a slide plate 8. On the camera housing 1 there is provided a stud 9 which engages in a slot 8a of the plate 8 whereby it is made adjustable for height. At its upper and lower ends the plate 8 has cross slots 8b and 8c in which locking levers 10 and 11, which can pivot on the camera housing about pivots 10a and 11a respectively, engage by means of studs 10b and 11b. Two locking devices of this nature are arranged on the camera housing 1 one on each side of the tube 2 so that when the camera is held in the hand, it is easy to grip by the parts 6b which are designed as a gripping surface. When, with the tube 2 pulled out, the lever 6 is pivoted in the direction of the arrow (Fig. 3), that is to say in the direction towards the camera housing 1, the lever 7 moves the plate 8 downwards, whereby lever arms 10c and 11c are made to penetrate the camera housing 1 and to come to rest behind the tube 2 which is then pressed with its outwardly flanged edge 2a firmly against the inwardly flanged edge 1a of the camera housing 1. This manner of locking the tube to the camera housing 1 insures the firm positioning of the lens plate and at the same time it takes the stress off the struts 4 and 5 whose main purpose is the guiding of the tube 2. The production of these struts thus does not require precision manufacturing methods.

By attaching the ends 4a and 5a of the struts to the tube 2 and by providing a pin 12 on the lazy-tongs strut 5, there is provided a means of control for a mirror 13, which can be pivoted about a pivot 14a, and which rests with an abutment 14b of the frame 14 on the pin 12. The mirror frame 14 is loaded by a spring 15 which tends to urge the mirror frame 14 towards the light-sensitive surface of the photographic material, i.e. into the plane of the aperture. The spring 15 is weaker than the spring (not shown) which operates the blind of the focal plane shutter. According to the known arrangement (likewise not shown) the spring which triggers the shutter can be made to turn the mirror 13 upwards against loading by the spring 15 when the shutter is released. In connection with the abutment 14b there is provided on the frame 14 of the reflex mirror 13 a flanged lug 14c such that, when the tube 2 is being pushed into the camera housing 1, the pin 12 slides into the camera housing 1 along the inside of the flange of the lug 14c and, when the camera is closed, takes up the position shown in Fig. 2. On the inside of the tube 2 there is further attached a link 17 of which the other end 17a is pivoted on the frame 18 of a focusing screen 22. When the tube 2 is extended, the focusing screen frame 18, which can be pivoted about a pivot 18a, rests against the part 2b of the tube 2. The locking of the focusing screen frame 18 is carried out by means of a toggle lever 20 which is attached to the tube 2 and can pivot about a pivot 19. This lever 20 is loaded by a spring 21 which is attached to the tube 2 and tends to pull the toggle lever 20 into the position shown in Fig. 2. The toggle lever 20 further has a recess 20a in which engages a pin 5c located on the end 5a of the strut 5. On the focusing screen frame 18 there is provided a pin 18b which rests on a surface 20c of the toggle lever 20 when the focusing screen is in the locked position.

The arrangement of these parts enables the following mode of operation: When the tube 2 is extended, the focusing screen frame 18 is pivoted by the link 17 from its position perpendicular to the axis of the lens (see Fig. 2) upwards about the pivot 18a. At the same time, the pin 5c engages in the recess 20a of the toggle lever 20 whereby this lever is pivoted about the pivot 19 against loading by the spring 21. In this connection it may happen that the action of the link 17 is insufficient to bring the focusing screen frame 18 completely into the viewing position. To take account of this contingency, the toggle lever 20 has an inclined surface 20b upon which the pin 18b can slide and, after having passed the inclined surface 20b and arrived on the surface 20c, this latter locks the pin 18b. The focusing screen frame 18 is thus controlled by the tube 2 when the latter is being extended and is locked by it in the viewing position.

With the focusing screen frame 18 there is also connected through a link 24, a cover 23 in the form of a lid which is adapted to cover the camera housing and the focusing screen 22 when the tube 2 is pushed into the housing 1, so that the said cover 23 is also controlled through the focusing screen 18 by the camera tube 2. At the top of the lid 23 is provided a hinged focusing magnifier 25.

Obviously many modifications and variations of the present invention are possible in the light of the above teachings. It is, therefore, to be understood that within the scope of the appended claims the invention may be practiced otherwise than as specifically described.

What is claimed in this invention is:

1. An extensible reflex camera comprising a rigid housing, the front wall of said housing including a stationary extending flange surrounding an aperture, a rigid movable extension tube extending through said aperture and including an outwardly extending flange which contacts said inwardly extending flange of said housing when said tube is fully extended away from said housing, an objective lens mounted in said tube, lazy tongs struts for guiding the inward and outward movements of said tube relative to said housing, freely-adjustable connecting means engaging said lazy tongs struts with said tube and housing to permit said struts to guide said inward and outward movements of said tube relative to said housing without positively limiting said inward and outward movements, a reflex mirror and a focusing screen rotatably mounted within said housing, a first and second actuating means operatively associating said reflex mirror and said focusing screen respectively with said lazy tongs struts and with said tube for urging said screen and said mirror into the viewing position when said tube is extended, and a locking means operatively associated with said housing and being constructed and arranged to engage the rear surface of said outwardly extending flange of said tube when said tube is moved to the fully outwardly extended position relative to said housing for firmly locking said outwardly extending flange against said stationary inwardly extending flange without applying stress to said lazy tongs struts.

2. A camera as claimed in claim 1, in which the locking mechanism for the extension tube consists of a pair of units oppositely disposed with respect to the tube, each unit comprising a lever pivoted to the exterior of the camera housing and being pivotable towards said housing under manual pressure, a slide connected to said lever by a link so that angular movement of the lever is converted into linear movement of the slide, and one or more pivotable locking members, pivot means coupling said locking members to said housing, said locking members having pin and slot connections with the slide and being pivotable thereby to lock the tube on application of pressure to the lever.

3. A camera as claimed in claim 1, having a spring loaded locking lever pivoted to the extension tube and to said focusing screen, a lazy tongs strut operatively coupled to said housing and to said extension tube, said strut engaging said locking lever to lock the focusing screen in the viewing position when the tube is extended.

4. A camera as claimed in claim 3, in which the locking lever is a toggle lever, one end of which is provided with a recess which, when the tube is extended, is adapted to be engaged by a pin on the lazy tongs strut, said strut being spring loaded, the other end of said lever being arranged to contact an abutment on the focusing screen frame when the tube is extended.

5. A camera as claimed in claim 4, in which the said other end of the toggle lever has an inclined surface for the abutment to slide upon towards the locked position and a locking surface upon which the abutment rests in the locked position.

6. A camera as claimed in claim 1 having a cover, in which the focusing screen frame has a connecting link connecting it to the cover so that in the collapsed position of the camera the cover is substantially flush with the surface of the camera housing while in the extended position the cover rises from the camera to reveal the focusing screen in the viewing position.

7. A camera as set forth in claim 1 in which a spring bears against said pivotably mounted reflex mirror in a direction to cause said mirror to take up a position parallel to the plane of the aperture of said camera, said lazy tongs mechanism includes a projection, abutments mounted upon said mirror, one of said abutments being mounted at a distance from the pivot at which it is disposed to bear against said projection in a direction to collapse said lazy tongs mechanism when said tube is inserted within said housing, said projection moving against said one abutment in a direction to move said mirror to and past the viewing position when said tube is extended, and said other abutment being mounted upon said mirror at a distance from the mirror pivot at which it is disposed to contact said projection when said lazy tongs mechanism is extended to arrest said mirror at said viewing position when said spring causes said mirror to move from a position past said viewing position towards said position parallel to said plane.

8. A camera as set forth in claim 7 in which said projection is comprised of a pin disposed upon said lazy tongs mechanism, said other abutment is comprised of an extension which arrests said mirror upon said pin in said viewing position when said mirror is moving from a position past said viewing position towards said plane, and said one abutment is comprised of a flanged lug, said flanged lug being mounted at a position upon said mirror closer to the pivot of said mirror than said extension so that its flange contacts said pin when said lazy tongs mechanism is collapsed and said extension contacts said pin when said lazy tongs mechanism is extended.

9. A camera as claimed in claim 1 in which said second means operatively coupling said focusing screen to said extension tube is comprised of a link pivotally coupled to said focusing screen and said extension tube, said pivotal connection between said link and said extension tube being slotted so that said screen is folded into a position substantially parallel with the plane of the camera aperture when said tube is inserted within said housing, and said screen is pivoted into the viewing position when said tube is extended.

10. A reflex camera as set forth in claim 1 wherein said freely-adjustable connecting means includes pin and slot coupling elements.

11. A reflex camera as set forth in claim 10 wherein the lower end of one of said struts is connected to said housing by means of a pin, and its upper end is connected to said tube by means of a pin and slot connection, and the other of said struts being connected to the lower end of said tube by means of a pin and to the upper end of said housing by means of a pin and slot connection.

12. A reflex camera as set forth in claim 11 wherein a toggle lever is operatively associated with said focusing screen and with the upper pin and slot connection at the upper end of said tube, and said toggle lever is constructed and arranged to adjust said focusing screen into the viewing position when said tube is extended away from said housing and said upper pin is moved adjacent the lower end of said slot into contact wtih said toggle lever.

References Cited in the file of this patent

UNITED STATES PATENTS

| 746,459 | Case | Dec. 8, 1903 |
| 754,872 | Hutchings | Mar. 15, 1904 |
| 933,713 | Kroedel | Sept. 7, 1909 |
| 1,284,980 | Azzoni et al. | Nov. 19, 1918 |
| 1,295,395 | Wade | Feb. 25, 1919 |
| 1,301,819 | Clark | Apr. 29, 1919 |
| 1,581,853 | Mathews | Apr. 20, 1926 |
| 2,054,035 | Crumrine | Sept. 8, 1936 |
| 2,177,770 | Goldhammer | Oct. 31, 1939 |
| 2,193,019 | Christie | Mar. 12, 1940 |

FOREIGN PATENTS

| 8,580 | Great Britain | July 6, 1911 |